(12) United States Patent
Misumi et al.

(10) Patent No.: US 8,380,183 B2
(45) Date of Patent: Feb. 19, 2013

(54) COMMUNICATION SYSTEM, AND COMMUNICATION DEVICE AND PHONE DEVICE FOR THE SAME

(75) Inventors: Kazuhito Misumi, Aichi-ken (JP); Sayaka Taniguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/072,731

(22) Filed: Mar. 27, 2011

(65) Prior Publication Data

US 2011/0244849 A1 Oct. 6, 2011

(30) Foreign Application Priority Data

Mar. 31, 2010 (JP) ................................. 2010-082351

(51) Int. Cl.
*H04W 4/00* (2009.01)
(52) U.S. Cl. .................................. 455/422.1; 455/426.1
(58) Field of Classification Search .................. 455/410, 455/411, 413, 414.1, 415, 426.1, 422.1
See application file for complete search history.

(56) References Cited

U.S. PATENT DOCUMENTS

| 2004/0100934 A1 | 5/2004 | Kachi | |
|---|---|---|---|
| 2008/0298603 A1* | 12/2008 | Smith | ............................. 381/67 |

FOREIGN PATENT DOCUMENTS

| JP | 2002-077022 A | 3/2002 |
|---|---|---|
| JP | 2004-173176 A | 6/2004 |
| JP | 2006-333360 A | 12/2006 |

* cited by examiner

*Primary Examiner* — Sam Bhattacharya
(74) *Attorney, Agent, or Firm* — Baker Botts L.L.P.

(57) ABSTRACT

A communication system switches a communication state from a first communication state where a communication device performs data communication and voice communication with an external device, a first phone device, and a second phone device to a second communication state to perform the voice communication between the communication device and the second phone device and the data communication between the first phone device and the external device, when the voice communication is started using the second phone device in response to a call from a communication line. The second communication state is set when a first-phone-device network ID is used for the communication device, a communication-device network ID is used for the first phone device, and a party device of the second phone device is set to a device identified with the first-phone-device network ID.

7 Claims, 12 Drawing Sheets

COMMUNICATION SYSTEM, AND COMMUNICATION DEVICE AND PHONE DEVICE FOR THE SAME

CROSS-REFERENCE TO RELATED APPLICATION

This application claims priority under 35 U.S.C. §119 from Japanese Patent Application No. 2010-082351 filed on Mar. 31, 2010. The entire subject matter of the application is incorporated herein by reference.

BACKGROUND

1. Technical Field

The following description relates to one or more communication systems configured to perform wireless voice communication and wireless data communication.

2. Related Art

A technique has been known in which one of wireless terminal devices establishes a network as a control station and the other wireless terminal devices join the network as slave stations. Further, a technique has been known in which a role as the control station is transferred from a terminal device that already serves as the control station to a slave station. In switching the control station, information such as "the control station is to be switched," "a newly-set control station," and "a moment when the control station is to be switched" is placed in a periodically-issued beacon frame, and transmitted to all the terminal devices on the network.

SUMMARY

In the known technique, each of the terminal devices on the network is required to configure a setting therefor to switch the control station. Hence, it might result in undesired situations that a complicated control for switching the control station takes a long time and/or increases a load placed on the network to switch the control station.

Aspects of the present invention are advantageous to provide one or more improved techniques that make it possible to overcome the above undesired situations.

According to aspects of the present invention, a communication system is provided, which includes a communication device connected with a communication line, a first phone device, and a second phone device. The communication system connects the communication device, the first phone device, and the second phone device with each other in a wireless communication. The communication device includes a wireless communication unit configured to wirelessly perform data communication and voice communication with an external device, the first phone device, and the second phone device, and a communication-device storage unit configured to store a communication-device network ID for identifying the communication device and a first-phone-device network ID for identifying the first phone device. The first phone device includes a first-phone-device storage unit configured to store the first-phone-device network ID and the communication-device network ID. The communication system is configured to switch a communication state thereof from a first communication state to a second communication state when voice communication is started using the second phone device in response to an incoming call from the communication line. The first communication state, in which the wireless communication unit performs the data communication and the voice communication with the external device, the first phone device, and the second phone device, is set when the communication-device network ID is used for the communication device such that the communication device is recognized as the communication device on the communication system, the first-phone-device network ID is used for the first phone device such that the first phone device is recognized as the first phone device on the communication system, and a party device with which each of the external device, the first phone device, and the second phone device is to communicate is set to a device for which the communication-device network ID is used. The second communication state, in which the voice communication is performed between the wireless communication unit and the second phone device and the data communication is performed between the first phone device and the external device, is set when the first-phone-device network ID is used for the communication device such that the communication device is recognized as the first phone device on the communication system, the communication-device network ID is used for the first phone device such that the first phone device is recognized as the communication device on the communication system, and a party device with which the second phone device is to communicate is set to a device for which the first-phone-device network ID is used.

According to aspects of the present invention, further provided is a communication device configured to be connected with a communication line and wirelessly communicate with a first phone device and a second phone device. The communication device includes a wireless communication unit configured to wirelessly perform data communication and voice communication with an external device, the first phone device, and the second phone device, a communication-device storage unit configured to store a communication-device network ID for identifying the communication device and a first-phone-device network ID for identifying the first phone device, and a communication-device controller configured to selectively set one of the communication-device network ID and the first-phone-device network ID as a network ID for the communication device. The communication-device controller is configured to switch a communication state from a first communication state to a second communication state in response to receiving, from one of the first phone device and the second phone device, a response signal to an incoming call from the communication line. When the communication-device controller sets the communication-device network ID as the network ID for the communication device, the first communication state is set, in which the wireless communication unit performs the data communication and the voice communication with the external device, the first phone device, and the second phone device. When the communication-device controller sets the first-phone-device network ID as the network ID for the communication device and the wireless communication unit sends to the second phone device a command to set a device for which the first-phone-device network ID is used as a party device with which the second phone device is to communicate, the second communication state is set, in which the voice communication is performed between the wireless communication unit and the second phone device.

According to aspects of the present invention, further provided is a phone device configured to wirelessly communicate with a communication device connected with a communication line. The phone device includes a phone-device storage unit configured to store a phone-device network ID for identifying the phone device and a communication-device network ID for identifying the communication device, and a phone-device controller configured to selectively set one of the communication-device network ID and the first-phonedevice network ID as a network ID for the phone device. The phone-device controller is configured to switch a communication state from a first communication state to a second communication state in response to receiving a communication state changing instruction from the communication device. When the phone-device controller sets the phone-device network ID as the network ID for the phone device, the first communication state is set, in which voice communication is performed between the phone device and the communication device. When the phone-device controller sets the communication-device network ID as the network ID for the phone device, the second communication state is set, in which data communication is performed between the phone device and an external device configured to communicate with a device for which the communication-device network ID is used.

BRIEF DESCRIPTION OF THE ACCOMPANYING DRAWINGS

FIG. 1 exemplifies a configuration of a communication system in an embodiment according to one or more aspects of the present invention.

Figure 9:
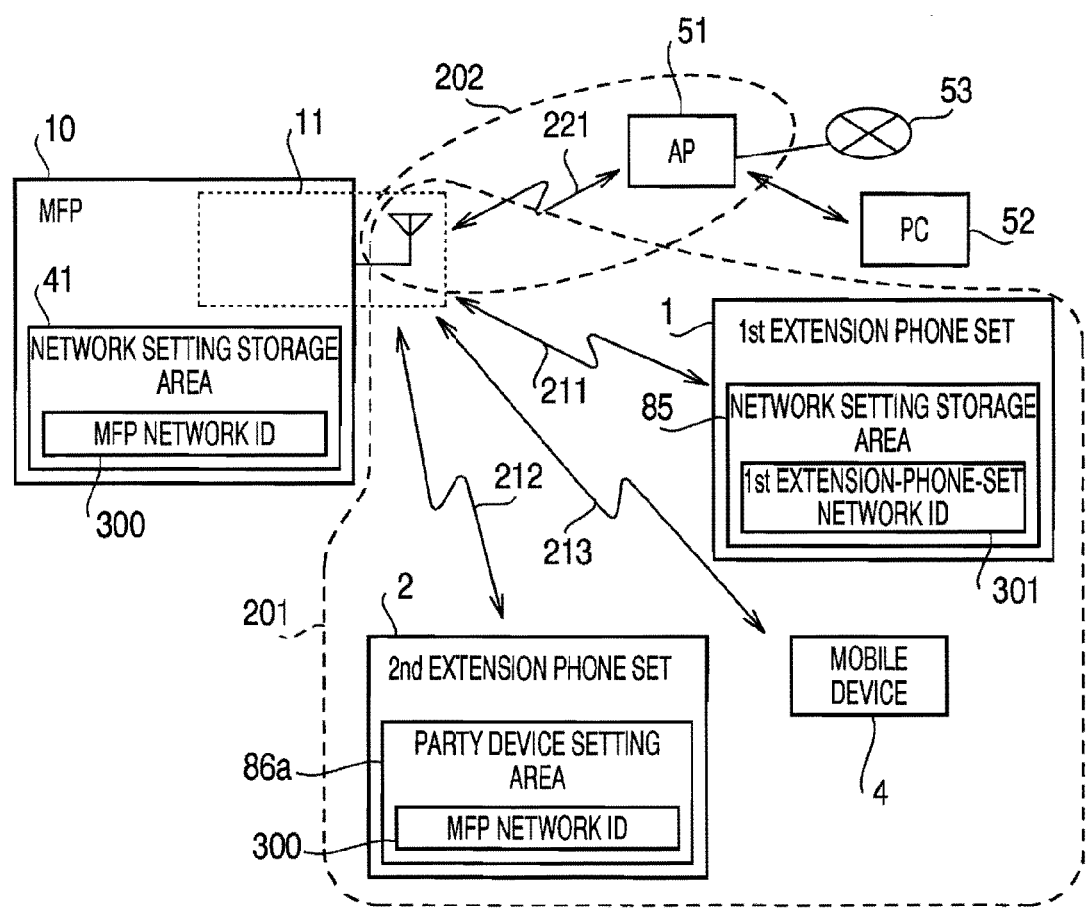

FIG. 9 schematically illustrates the first communication state in the embodiment according to one or more aspects of the present invention.

Figure 10:
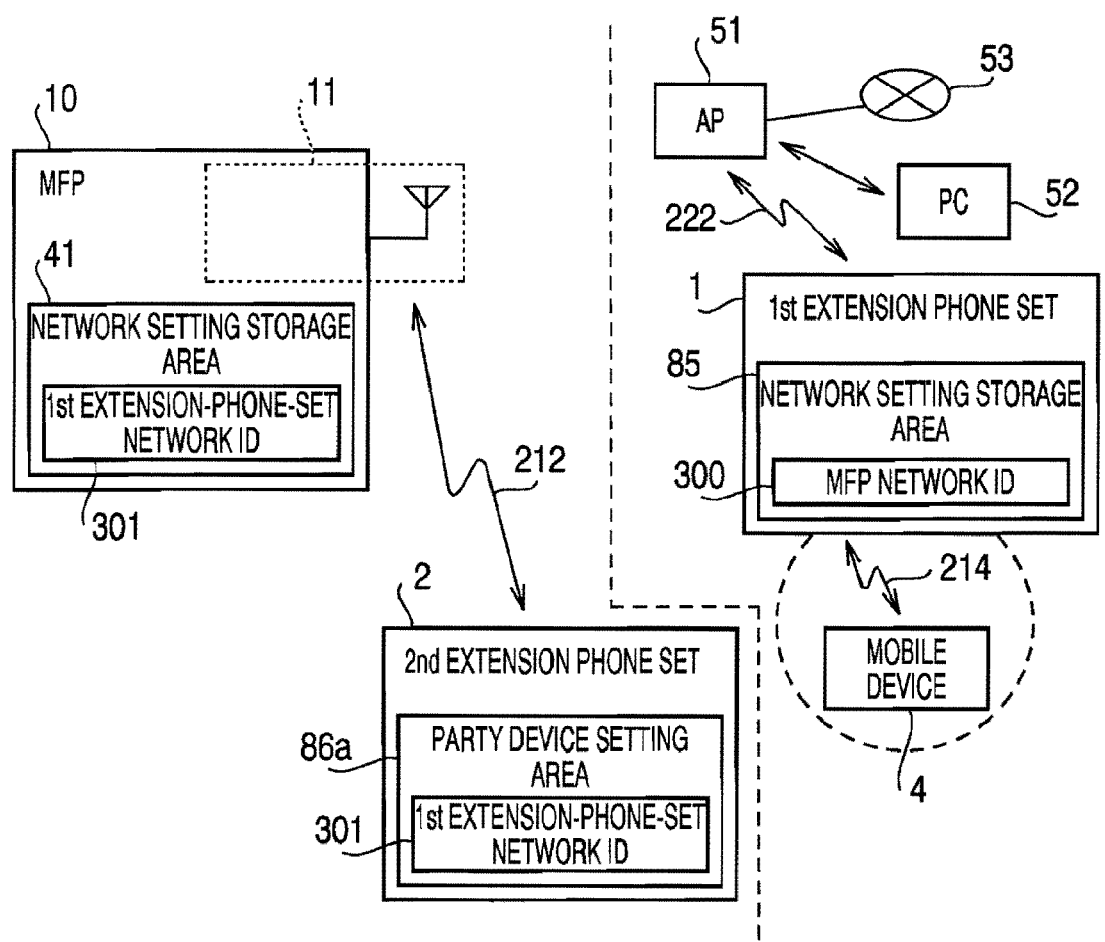

FIG. 10 schematically illustrates the second communication state in the embodiment according to one or more aspects of the present invention.

Figure 11:
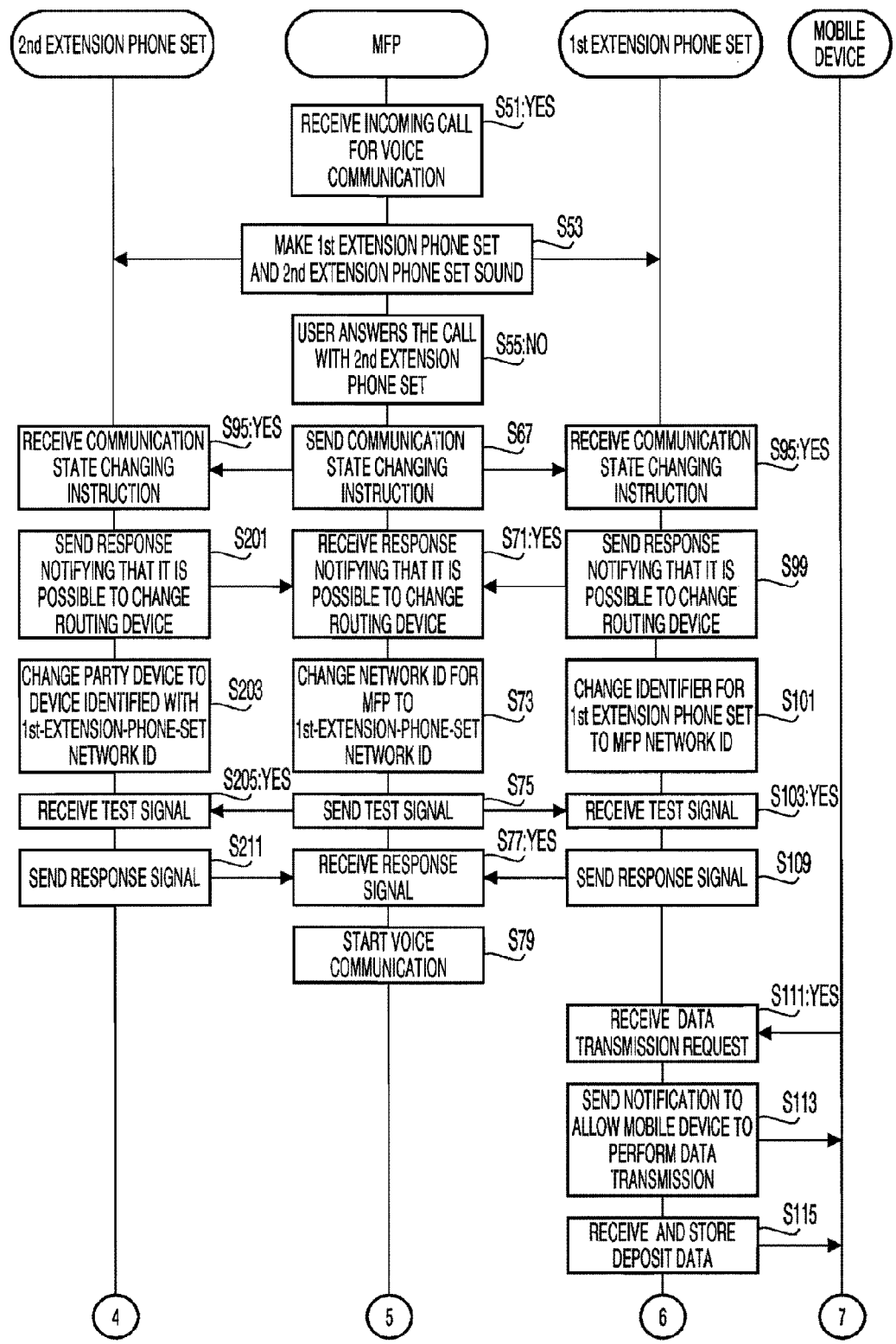
Figure 12:
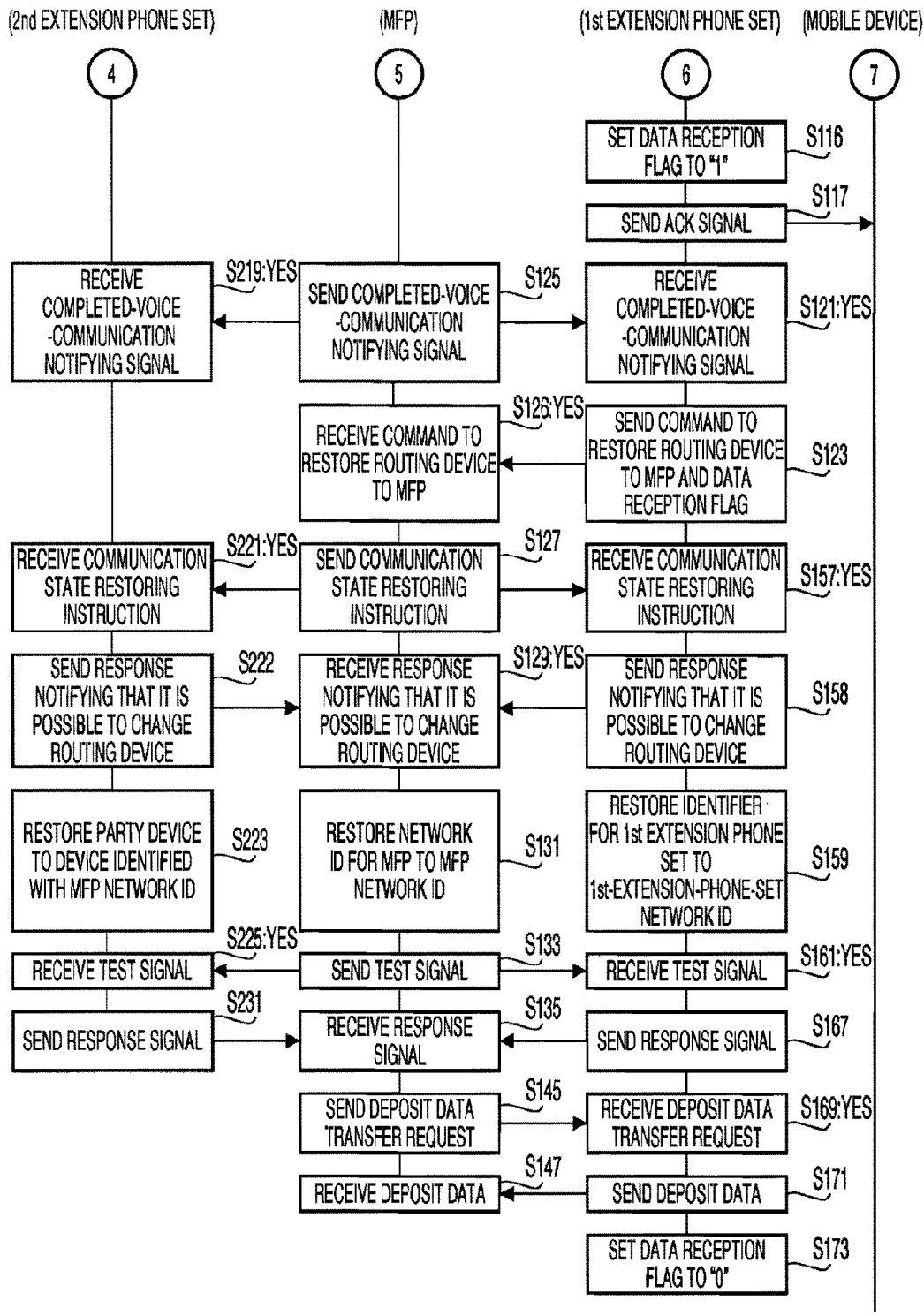

FIGS. 11 and 12 are sequence charts exemplifying a procedure of processes to be executed in the communication system in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
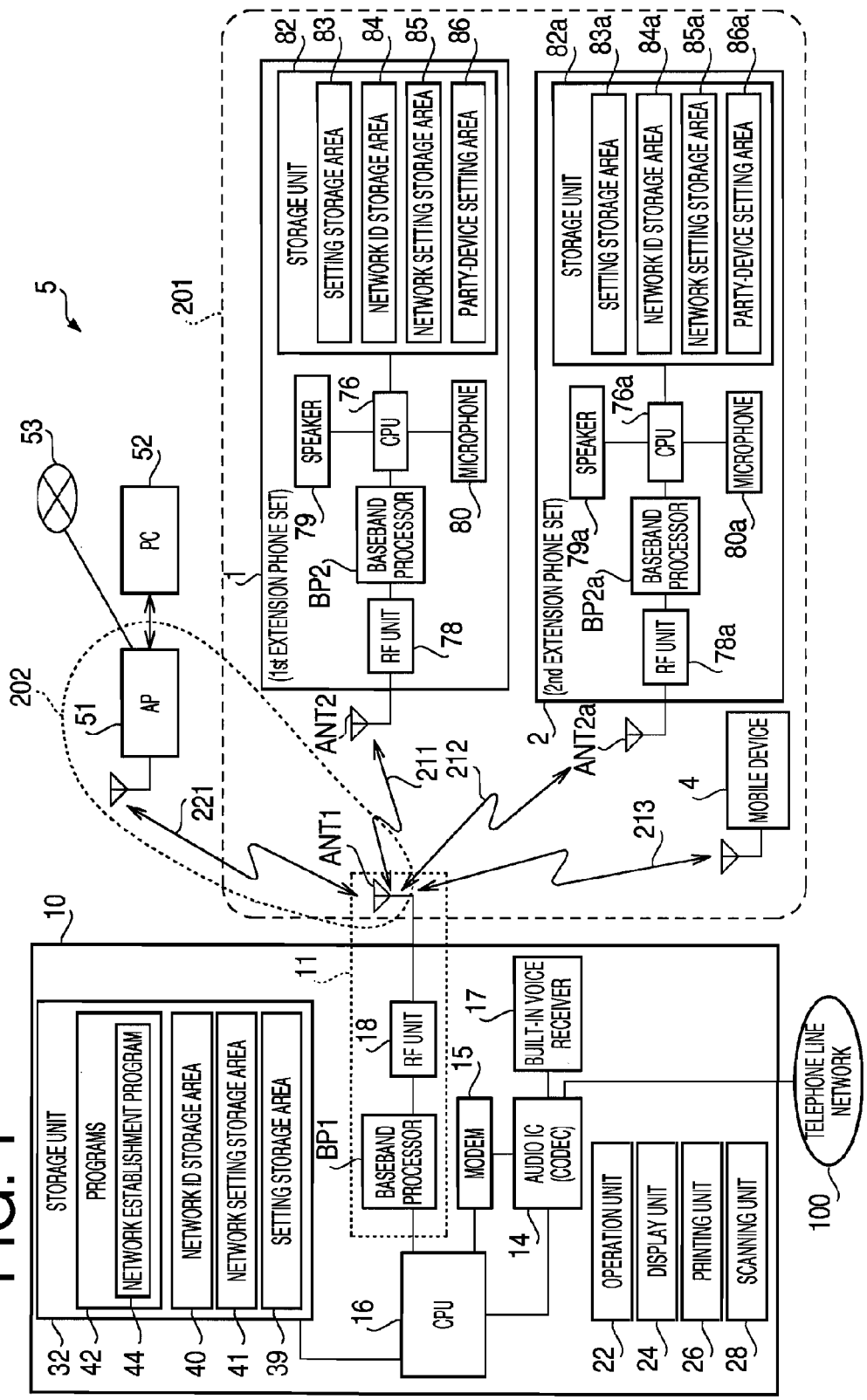

As shown in FIG. 1, a communication system 5 of an embodiment according to aspects of the present invention includes a multi-function peripheral (MFP) 10, an access point (AP) 51, a personal computer (PC) 52, a first extension phone set 1, a second extension phone set 2, and a mobile device 4. A wireless personal area network (WPAN) 201 and a wireless local area network (WLAN) 202 are formed to be connected with the MFP 10. It is noted that each of the WPAN 201 and the WLAN 202 may be established, e.g., based on a communication method complying with one of the standards IEEE 802.11a/b/g.

The AP 51 is a known relay device configured to perform data communication of a data signal via the WLAN 202. The data signal is re-transmitted in the case of a communication error. For instance, as an example of the data signal, cited is print data based on which the MFP 10 perform printing. Further, the AP 51 is configured to transmit the data signal to the PC 52 or receive the data signal from the PC 52. In other words, data communication of the data signal is performed between the MFP 10 and the PC 52 via the AP 51. Further, the AP 51 is linked with an Internet 53.

The first extension phone set 1 is configured to perform wireless communication 211 of an audio signal via the WPAN 201. Further, the second extension phone set 2 is also configured to perform wireless communication 212 of an audio signal via the WPAN 201. The audio signal is a signal for performing voice communication. The audio signal is not re-transmitted in the case of a communication error, and is required to be transmitted on a real-time basis.

The mobile device 4 is a known device configured to perform wireless communication 213 of the data signal via the WPAN 201. In addition, the MFP 10 has a function of a routing device (i.e., a device for selecting an information transmission channel in the communication system 5). Therefore, the mobile device 4 is connectable to the Internet 53 via the MFP 10 and the AP 51.

The MFP 10 includes a CPU 16, a storage unit 32, a wireless communication control circuit 11, an audio IC 14 (CODEC), a modem 15, a built-in voice receiver 17, an operation unit 22, a display unit 24, a printing unit 26, and a scanning unit 28. The above elements included in the MFP 10 are communicably connected with each other. The CPU 16 performs various processes in accordance with programs 42 stored on the storage unit 32. Further, the CPU 16 takes various controls for the storage unit 32, the wireless communication control circuit 11, and the audio IC 14.

The storage unit 32 stores the programs 42, which include basic programs (not shown), and a network establishment program 44. The basic programs include a program for controlling the printing unit 26 to perform a printing operation, and a program for controlling the scanning unit 28 to perform a scanning operation. The network establishment program 44 is a program for switching between a first communication state and a second communication state. It is noted that the first and second communication states will be described later.

It is noted that the storage unit 32 is configured with a combination of at least two of a RAM, a ROM, a flash memory, and a hard disk drive (HDD). The storage unit 32 includes a setting storage area 39, a network ID storage area 40, and a network setting storage area 41. The setting storage area 39 is an area to store various settings.

The network ID storage area 40 stores an MFP network ID 300, a first-extension-phone-set network ID 301, and a second-extension-phone-set network ID 302. The MFP network ID 300 is information for identifying the MFP 10 on a network, and includes an MFP-MAC address and an MFP-IP address. Additionally, the first-extension-phone-set network ID 301 is information for identifying the first extension phone set 1 on a network, and includes a first-extension-phone-set MAC address and a first-extension-phone-set IP address. Further, the second-extension-phone-set network ID 302 is information for identifying the second extension phone set 2 on a network, and includes a second-extension-phone-set MAC address and a second-extension-phone-set IP address. The network setting storage area 41 is configured to store an identifier for the MFP 10. When the MFP network ID 300 is stored in the network setting storage area 41, the MFP 10 is recognized as the MFP 10 by the other devices on the communication system 5. Meanwhile, when the first-extension-phone-set network ID 301 is stored in the network setting storage area 41, the MFP 10 is recognized as the first extension phone set 1 by the other devices on the communication system 5.

The wireless communication control circuit 11 includes a baseband processor BP1, an RF unit 18, and an antenna ANT1. The baseband processor BP1 is a circuit configured to control the wireless communication control circuit 11 as a whole. The RF unit 18 is a circuit configured to perform signal communication with the antenna ANT1. The audio IC 14 (CODEC) is configured to perform data encoding and data decoding. Further, the audio IC 14 selects one of the modem 15 and the built-in voice receiver 17 that is to be connected with a telephone line network 100. The modem 15 is configured to control communication of an audio signal with the telephone line network 100. The operation unit 22 includes a plurality of buttons for accepting an input from the user. The display unit 24 is configured to display various kinds of information. The scanning unit 28 is configured to read a document and create scanned data based on the read document. The printing unit 26 is configured to print, on a sheet, print data received from an external device (e.g., the PC 52) and the scanned data created by the scanning unit 28.

The first extension phone set 1 includes a CPU 76, a baseband processor BP2, an RF unit 78, a speaker 79, a microphone 80, a storage unit 82, and an antenna ANT2. The CPU 76 is configured to take various sorts of controls for the storage unit 82 and the baseband processor BP2. The storage unit 82 includes a setting storage area 83, a network ID storage area 84, a network setting storage area 85, and a party-device setting area 86. The setting storage area 83 stores various parameters such as a data reception flag. The network ID storage area 84 stores the MFP network ID 300, the first-extension-phone-set network ID 301, and the second-extension-phone-set network ID 302. The network setting storage area 85 is an area to store an identifier for the first extension phone set 1. When the first-extension-phone-set network ID 301 is stored in the network setting storage area 85, the first extension phone set 1 is recognized as the first extension phone set 1 by the other devices on the communication system 5. Meanwhile, when the MFP network ID 300 is stored in the network setting storage area 85, the first extension phone set 1 is recognized as the MFP 10 by the other devices on the communication system 5. The party-device setting area 86 is an area to store a network ID of a device that is set as a party device of the first extension phone set 1. A device on the communication system 5, with which the first extension phone set 1 is to communicate, is determined based on a network ID stored in the party-device setting area 86. The speaker 79 is configured to output sound data received from the wireless communication control circuit 11. The microphone 80 is configured to acquire sound data. Since other configurations of the first extension phone set 1 are the same as those of the MFP 10, detailed explanation about them will be omitted.

The second extension phone set 2 includes a CPU 76*a*, a baseband processor BP2*a*, an RF unit 78*a*, a speaker 79*a*, a microphone 80*a*, a storage unit 82*a*, and an antenna ANT2*a*. Further, the storage unit 82*a* includes a setting storage area 83*a*, a network ID storage area 84*a*, a network setting storage area 85*a*, and a party device setting area 86*a*. Since the configuration of the second extension phone set 2 is the same as that of the first extension phone set 1, detailed explanation about it will be omitted.

The communication system 5 has two communication states, i.e., the first communication state and the second communication state. The first communication state is a state where the MFP 10 serves as the routing device. Meanwhile, the second communication state is a state where one of the first extension phone set 1 and the second extension phone set 2 serves as the routing device. The first communication state will be described with reference to FIG. 9. In the first communication state, the MFP network ID 300 is used as an identifier for the MFP 10. Therefore, the MFP 10 is recognized as the MFP 10 on the communication system 5. Further, the first-extension-phone-set network ID 301 is used as an identifier for the first extension phone set 1. Therefore, the first extension phone set 1 is recognized as the first extension phone set 1 on the communication system 5. Furthermore, a party device of the second extension phone set 2 is set as a device that uses the MFP network ID 300 as an identifier therefor.

In the first communication state, the WPAN 201 and the WLAN 202 are established by the wireless communication control circuit 11. The WPAN 201 is connected with a plurality of communication terminal devices (e.g., the first extension phone set 1, the second extension phone set 2, and the mobile device 4). Through the WPAN 201, the wireless communication 211 of the audio signal is performed between the wireless communication control circuit 11 and the first extension phone set 1. In addition, through the WPAN 201, the wireless communication 212 of the audio signal is performed between the wireless communication control circuit 11 and the second extension phone set 2. Further, through the WPAN 201, the wireless communication 213 of the data signal is performed between the wireless communication control circuit 11 and the mobile device 4. The wireless communications 211 to 213 can be performed in parallel. The WLAN 202 is connected with the AP 51. Through the WLAN 202, the wireless communication 221 of the data signal is performed between the wireless communication control circuit 11 and the AP 51. Namely, in the first communication state, the single wireless communication control circuit 11 realizes two kinds of communications, i.e., the voice communications with the first extension phone set 1 and the second extension phone set 2, and the data communication with the mobile device 4.

The WPAN 201 and the WLAN 202 are concurrently available. For instance, the WPAN 201 and the WLAN 202 are concurrently available using a time division multiple access (TDMA) method. In the TDMA, a carrier frequency used for transmission is divided into units which are referred to as time slots, such that a plurality of users can share the same frequency channel to perform their respective communications. In the embodiment, time slots are assigned to the WPAN 201 and WLAN 202, so as to establish multiple wireless connections. It is noted that the expression "the WPAN 201 and the WLAN 202 are concurrently available" in this case provides a meaning that communication using the WPAN 201 and communication using the WLAN 202 are executable in parallel during the same period of time. However, the expression is not limited to a meaning that a packet transmitted from the WPAN 201 and a packet transmitted from the WLAN 202 can be received at the same moment.

To make the wireless communication control circuit 11 serve as a circuit to establish the WPAN 201, for instance, a method using a function of Wi-Fi Direct, which the Wi-Fi Alliance proposes, may be applied. Thereby, the wireless communication control circuit 11 is made function as a server for Wi-Fi Direct. Alternatively, a method using a function of My WiFi Technology, which Intel (trademark registered) proposes, may be applied to make the wireless communication control circuit 11 serve as a circuit to establish the WPAN 201.

Further, in the WPAN 201, it is monitored whether there is a wireless communication device connectable to the WPAN 201 in a communication area where communication using the WPAN 201 is feasible. When a connectable communication device is newly detected, the newly-detected communication device is connected to the WPAN 201 via wireless communication so as to dynamically establish a network in the WPAN 201. It is noted that the first and second extension phone sets 1 and 2 may always be connected with the WPAN 201. Thereby, the user can use the first and second extension phone sets 1 and 2 as if the first and second extension phone sets 1 and 2 were normal cordless phones, without having to care about the presence of a dynamically-established network.

The second communication state will be described with reference to FIG. 10. As an example, a case where the first extension phone set 1 is used as the routing device will be described. In the second communication state, the network IDs used as the identifiers are interchanged between the MFP 10 and the first extension phone set 1. Specifically, the first-extension-phone-set network ID 301 is used as the identifier for the MFP 10. Further, the MFP network ID 300 is used as the identifier for the first extension phone set 1. Additionally, the party device of the second extension phone set 2 is set as a device that uses the first-extension-phone-set network ID 301 as the identifier therefor. Hence, the MFP 10 is recognized as the first extension phone set 1 on the communication system 5. Further, the first extension phone set 1 is recognized as the MFP 10 on the communication system 5.

A case where the communication state is switched from the first communication state to the second communication state will be described. In the second communication state, the mobile device 4 and the AP 51 maintain the data communication with a device that uses the MFP network ID 300 as an identifier therefor. However, in the second communication state, the device that uses the MFP network ID 300 as the identifier therefor is not the MFP 10 but the first extension phone set 1. Thus, the party device with which the mobile device 4 performs data communication is switched from the MFP 10 (the wireless communication 213) to the first extension phone set 1 (wireless communication 214). Further, the party device with which the AP 51 performs data communication is switched from the MFP 10 (the wireless communication 221) to the first extension phone set 1 (wireless communication 222). Additionally, in the second communication state, the second extension phone set 2 performs voice communication with a device that uses the first-extension-phone-set network ID 301 as an identifier therefor. However, in the communication state, the device that uses the first-extension-phone-set network ID 301 as the identifier therefor is not the first extension phone set 1 but the MFP 10. Thus, the MFP 10 (the wireless communication 212) is maintained as a party device with which the second extension phone set 2 performs voice communication.

As described above, in the second communication state (see FIG. 10), the wireless communication of the audio signal is performed between the wireless communication control circuit 11 and the second extension phone set 2. Additionally, the wireless communication 214 of the data signal is performed between the first extension phone set 1 and the mobile device 4. Further, the wireless communication 222 of the data signal is performed between the first extension phone set 1 and the AP 51. Thus, in the second communication state, it is possible to separate the voice communication (the wireless communication 212) from the data communication (the wireless communication 214).

Further, in the second communication state, the second extension phone set 2 may be set as the routing device. Such a case is realized by interchange between the first extension phone set 1 and the second extension phone set 2 in FIG. 10. Namely, in this case, wireless communication of the audio signal is performed between the wireless communication control circuit 11 and the first extension phone set 1. Additionally, wireless communication of the data signal is performed between the second extension phone set 2 and the mobile device 4. Further, wireless communication of the data signal is performed between the second extension phone set 2 and the AP 51.

Figure 2:
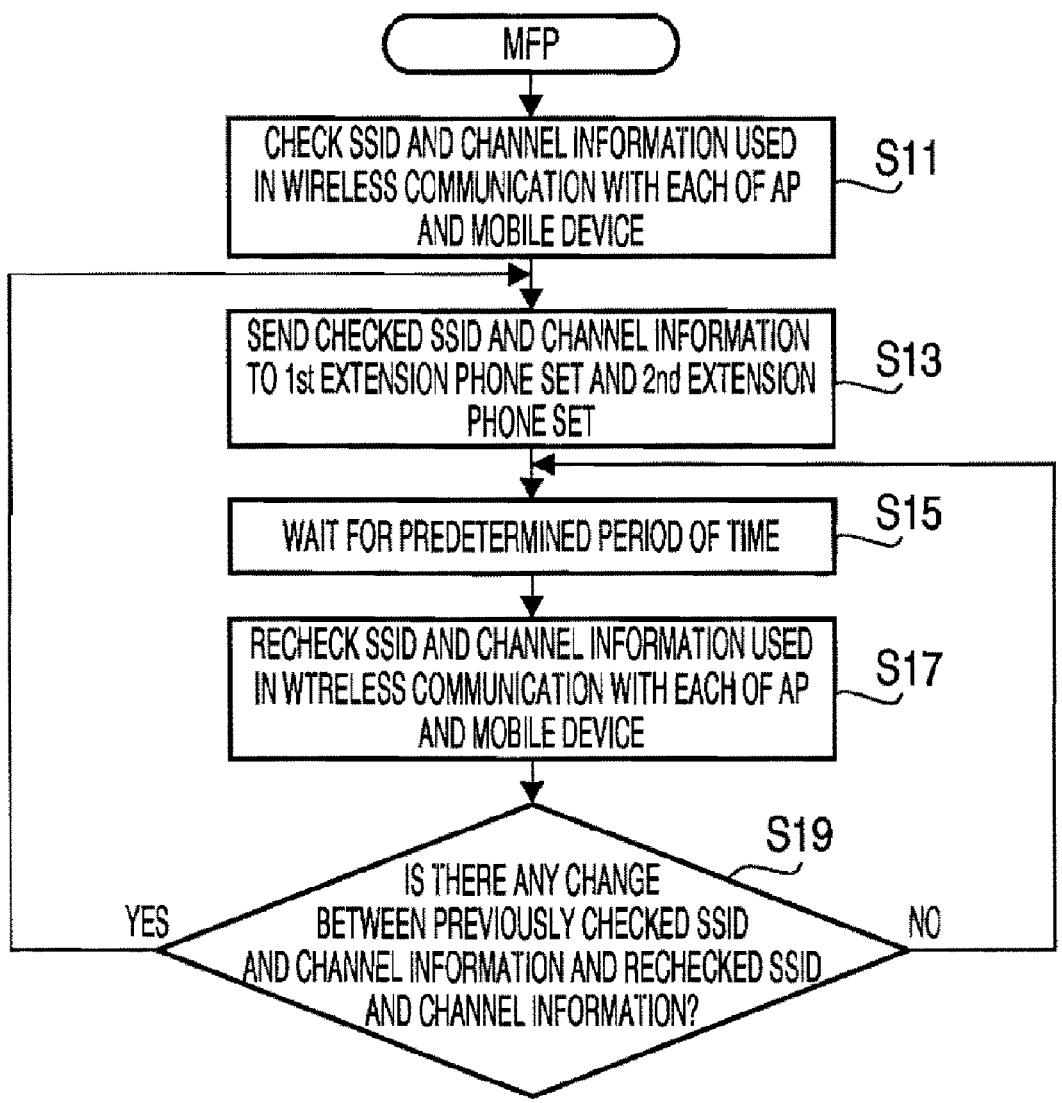
FIG. 2 is a flowchart showing a procedure of a communication state checking process to be executed by a multi-function peripheral (MFP) of the communication system in the embodiment according to one or more aspects of the present invention.

Subsequently, an explanation will be provided about a communication state checking process to be executed by the MFP 10 with reference to FIG. 2. The communication state checking process shown in FIG. 2 is launched in response to the MFP 10 being powered on. In S11, the CPU 16 checks a service set identifier (SSID) and channel information that are used in the wireless communication 221 with the AP 51 and stores the SSID and the channel information into the setting storage area 39. Further, the CPU 16 checks an SSID and channel information that are used in wireless communication with a wireless terminal device other than the first and second extension phone sets 1 and 2 in the WPAN 201 and stores the SSID and the channel information into the setting storage area 39. For instance, in the configuration as exemplified in FIG. 1, the CPU 16 checks an SSID and channel information that are used in the wireless communication 213 with the mobile device 4.

In S13, the CPU 16 sends the checked SSID and channel information to the first and second extension phone sets 1 and 2. In S15, the CPU 16 waits for a period of time. In S17, the CPU 16 rechecks the SSID and the channel information used in the wireless communications 221 and 213. In S19, the CPU 16 determines whether the rechecked SSID varies from the SSID stored in the setting storage area 39 and whether the rechecked channel information varies from the channel information stored in the setting storage area 39. When at least one of the rechecked SSID and channel information vary from the stored one (S19: Yes), the CPU 16 goes back to S13, in which the CPU 16 sends the rechecked SSID and channel information to the first and second extension phone sets 1 and 2. Meanwhile, when none of the rechecked SSID and channel information vary (S19: No), the CPU 16 goes back to S15, in which the CPU 16 waits for the predetermined period of time. Thereby, the MFP 10 always monitors whether there is a change in the SSID or the channel information. It is noted that the SSID and the channel information may be transmitted to the first and second extension phone sets 1 and 2 with a beacon broadcasted by the wireless communication control circuit 11.

Figure 3:
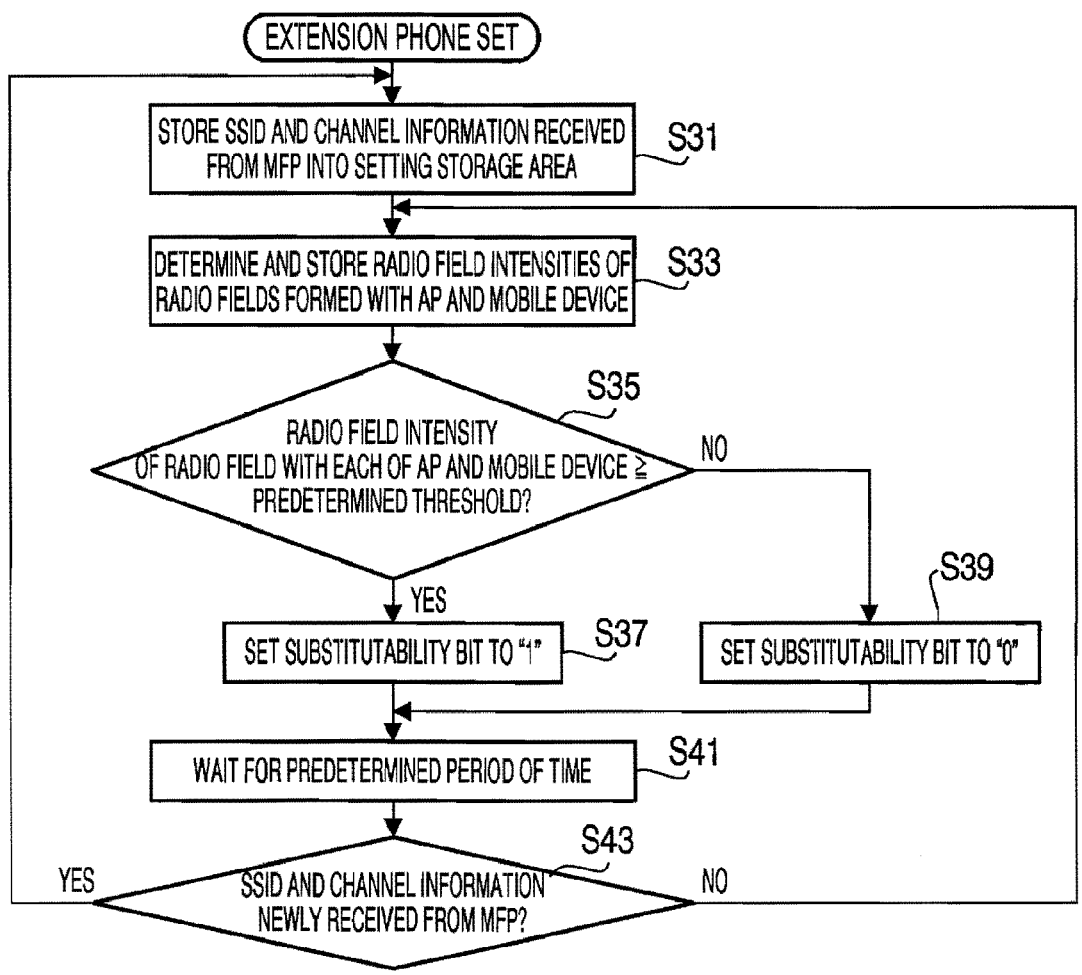
FIG. 3 is a flowchart showing a procedure of a substitutability checking process to be executed by an extension phone set of the communication system in the embodiment according to one or more aspects of the present invention.

An explanation will be provided about a substitutability checking process to be executed by the first and second extension phone sets 1 and 2, with reference to FIG. 3. It is noted that the following description will exemplify a substitutability checking process by the first extension phone set 1. In S31, the CPU 76 stores the SSID and the channel information received from the MFP 10 into the setting storage area 83. In S33, the CPU 76 determines a radio field intensity between the AP 51 and the first extension phone set 1 and a radio field intensity between the mobile device 4 and the first extension phone set 1, and stores the determined radio field intensities into the setting storage area 83.

In S35, the CPU 76 determines whether each of the radio field intensity between the AP 51 and the first extension phone set 1 and the radio field intensity between the mobile device 4 and the first extension phone set 1 is equal to or more than a predetermined threshold. When determining that each of the radio field intensity between the AP 51 and the first extension phone set 1 and the radio field intensity between the mobile device 4 and the first extension phone set 1 is equal to or more than a predetermined threshold (S35: Yes), the CPU 76 determines that in the second communication state, the wireless communication 222 between the first extension phone set 1 and the AP 51 and the wireless communication 214 between the first extension phone set 1 and the mobile device 4 can be performed in a preferable manner. Then, the CPU 76 goes to S37. The predetermined threshold for the radio field intensity may previously be set by a user and stored in the setting storage area 83.

In S37, the CPU 76 sets a substitutability bit stored in the setting storage area 83 to "1." The substitutability bit is a signal indicating whether the first extension phone set 1 can serve as the routing device in substitute for the MFP 10. The substitutability bit of "1" indicates that the first extension phone set 1 can serve as the routing device in substitute for the MFP 10. Meanwhile, the substitutability bit of "0" indicates that the first extension phone set 1 cannot serve as the routing device in substitute for the MFP 10. Thereafter, the CPU 76 goes to S41.

Meanwhile, when determining that at least one of the radio field intensity between the AP 51 and the first extension phone set 1 and the radio field intensity between the mobile device 4 and the first extension phone set 1 is not equal to or more than a predetermined threshold (S35: No), the CPU 76 goes to S39. In S39, the CPU 76 sets the substitutability bit to "0." Then, the CPU 76 goes to S41.

In S41, the CPU 76 waits for a predetermined period to time. In S43, the CPU 76 determines whether the CPU 76 has newly received SSID and channel information from the MFP 10. When determining that the CPU 76 has newly received SSID and channel information from the MFP 10 (S43: Yes), the CPU 76 goes back to S31. Meanwhile, when determining that the CPU 76 has not received SSID and channel information from the MFP 10 (S43: No), the CPU 76 goes back to S33. As described above, in the processes as shown in FIGS. 2 and 3, it is always monitored whether the first extension phone set 1 can serve as the routing device in substitute for the MFP 10. It is noted that a substitutability checking process by the second extension phone set 2 is substantially the same as the process shown in FIG. 3 with the first extension phone set 1 replaced with the second extension phone set 2. Hence, a detailed explanation about the substitutability checking process by the second extension phone set 2 will be omitted.

Figure 4:
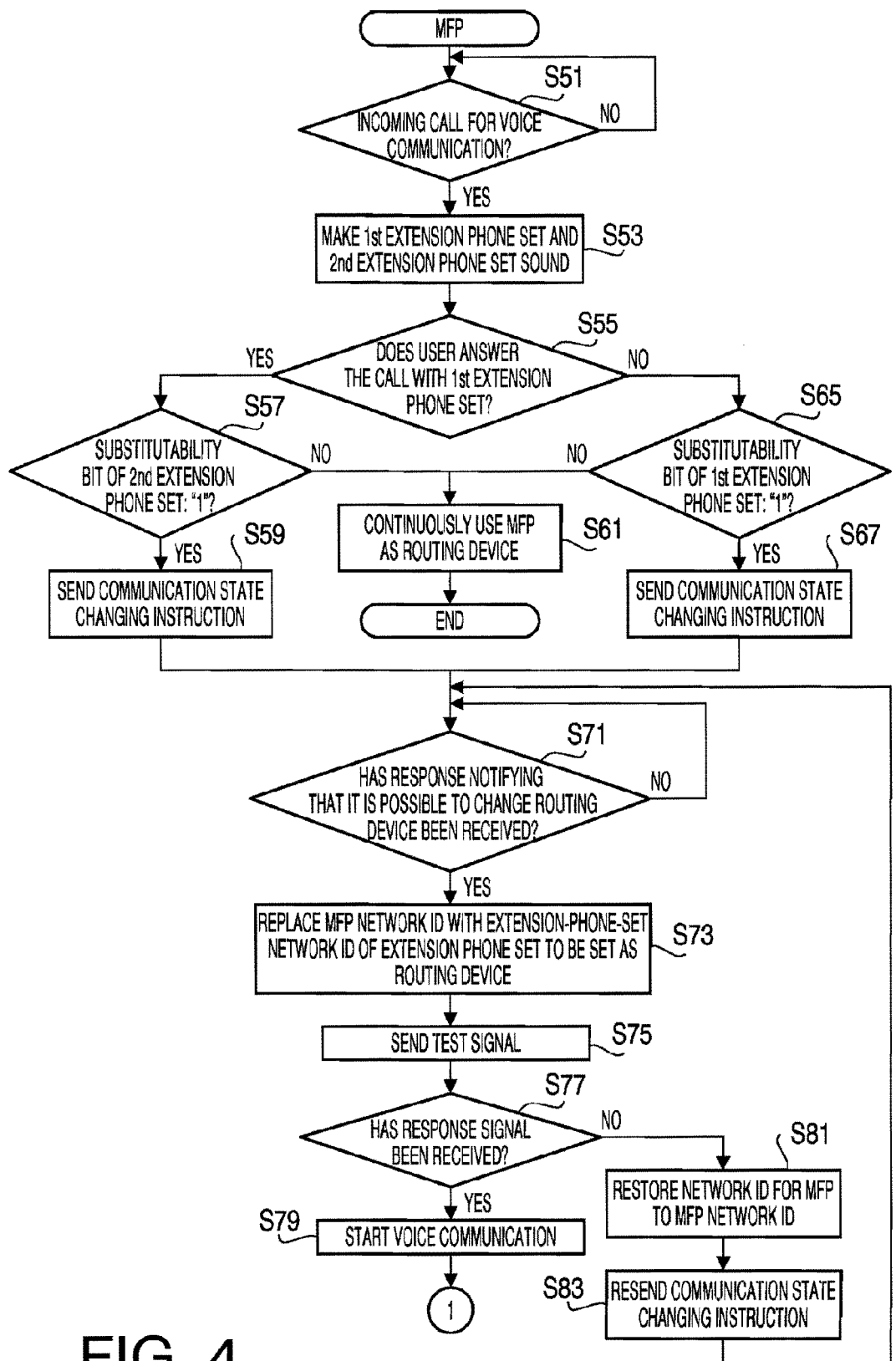
FIGS. 4 and 5 are flowcharts showing a procedure of a switching process to be executed by the MFP to switch a communication state between a first communication state and a second communication state in the embodiment according to one or more aspects of the present invention.
Figure 5:
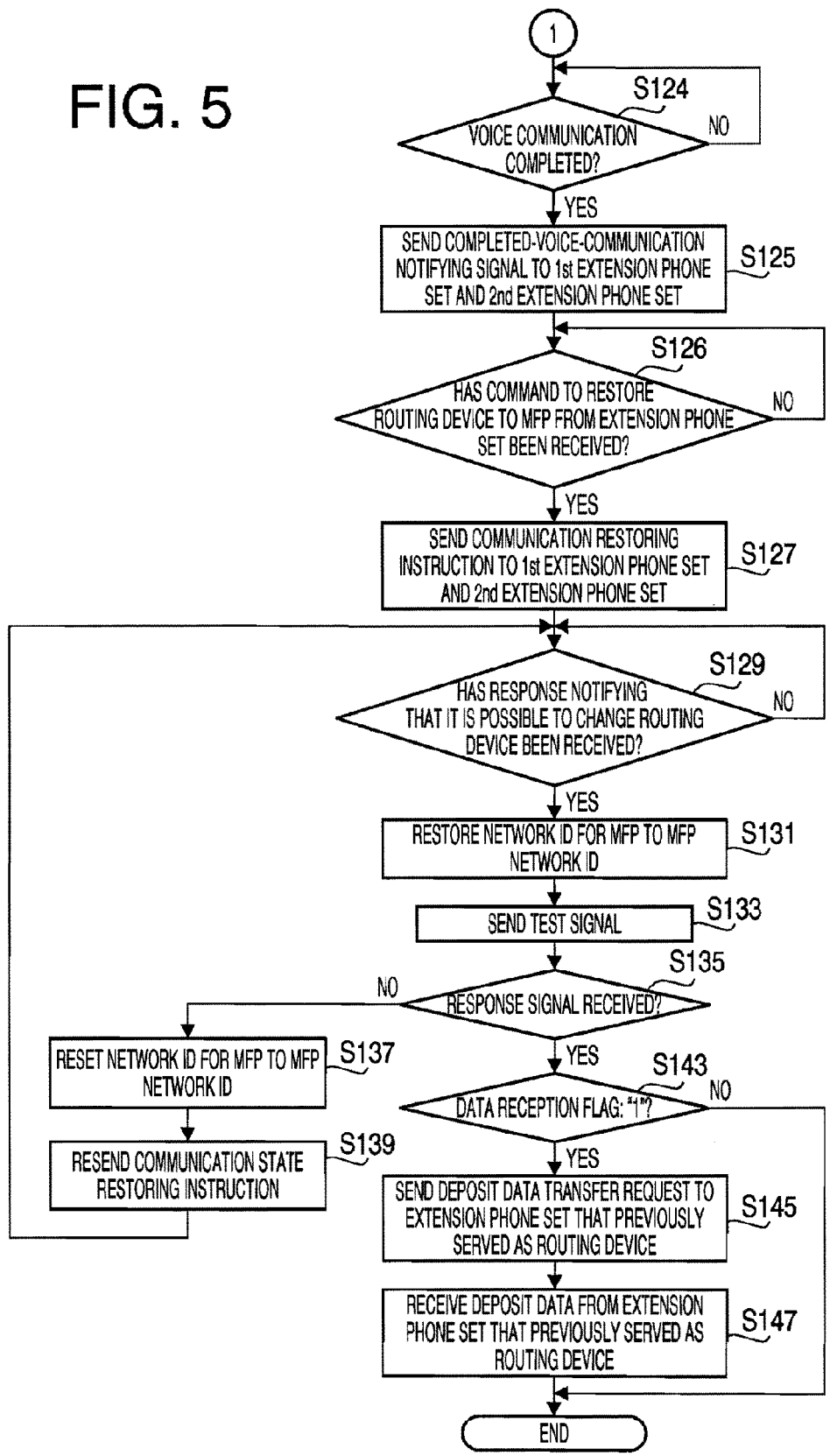

An explanation will be provided about a switching process to be executed by the MFP 10 to switch the communication state between the first communication state and the second communication state, with reference to FIGS. 4 and 5. In S51, the CPU 16 determines whether there is an incoming call for voice communication received from the telephone line network 100. When determining that there is not an incoming call for voice communication received from the telephone line network 100 (S51: No), the CPU 16 goes back to S51 to wait in a standby state. Meanwhile, when determining that there is an incoming call for voice communication received from the telephone line network 100 (S51: Yes), the CPU 16 goes to S53. In S53, the CPU 16 makes the first and second extension phone sets 1 and 2 sound.

In S55, the CPU 16 determines whether the user answers the call with the first extension phone set 1. When determining that the user answers the call with the first extension phone set 1 (S55: Yes), the CPU 16 goes to S57 to check whether the second extension phone set 2 can serve as the routing device in substitution for the MFP 10.

In S57, the CPU 16 determines whether the substitutability bit of the second extension phone set 2 is "1." When determining that the substitutability bit of the second extension phone set 2 is not "1" (S57: No), the CPU 16 goes to S61 based on the determination that the second extension phone set 2 cannot serve as the routing device in substitution for the MFP 10. In S61, the CPU 16 maintains the first communication state where the MFP 10 serves as the routing device. Then, the CPU 16 terminates the process shown in FIG. 4.

Meanwhile, when determining that the substitutability bit of the second extension phone set 2 is "1" (S57: Yes), the CPU 16 goes to S59 based on the determination that the second extension phone set 2 can serve as the routing device in substitution for the MFP 10. In S59, the CPU 16 sends, to the first and second extension phone sets 1 and 2, a communication state changing instruction to change the routing device from the MFP 10 to the second extension phone set 2. Then, the CPU 16 goes to S71.

Further, in S55, when the user answers the call with the second extension phone set 2 (S55: No), the CPU 16 goes to S65 to check whether the first extension phone set 1 can serve as the routing device in substitution for the MFP 10. In S65, the CPU 16 determines whether the substitutability bit of the first extension phone set 1 is "1." When determining that the substitutability bit of the first extension phone set 2 is not "1" (S65: No), the CPU 16 goes to S61 based on the determination that the first extension phone set 1 cannot serve as the routing device in substitution for the MFP 10. Meanwhile, when determining that the substitutability bit of the first extension phone set 2 is "1" (S65: Yes), the CPU 16 goes to S67 based on the determination that the first extension phone set 1 can serve as the routing device in substitution for the MFP 10. In S67, the CPU 16 sends, to the first and second extension phone sets 1 and 2, a communication state changing instruction to change the routing device from the MFP 10 to the first extension phone set 1. Then, the CPU 16 goes to S71. It is noted that the communication state changing instruction may be transmitted, for instance, with a beacon broadcasted by the wireless communication control circuit 11.

In S71, the CPU 16 determines whether the CPU 16 has received a response notifying that it is possible to change the routing device, from each of the first and second extension phone sets 1 and 2. When determining that the CPU 16 has not received such a response from each of the first and second extension phone sets 1 and 2 (S71: No), the CPU 16 goes back to S71 to wait in a standby state. Meanwhile, when determining that the CPU 16 has received such a response from each of the first and second extension phone sets 1 and 2 (S71: Yes), the CPU 16 goes to S73.

In S73, the CPU 16 reads out the extension-phone-set network ID of the extension phone set 1 or 2 to be set as the routing device from the network ID storage area 40. Then, the CPU 16 replaces the MFP network ID 300 stored in the network setting storage area 41 with the read extension-phone-set network ID. Thereby, the communication state is switched from the first communication state (see FIG. 9) to the second communication state (see FIG. 10). Thus, it is possible to switch the communication state from the first communication state to the second communication state in response to voice communication being launched with one of the first and second extension phone sets 1 and 2.

In S75, the CPU 16 sends a simple test signal to the first and second extension phone sets 1 and 2. As an example of the test signal, it is possible to cite a Ping signal.

In S77, the CPU 16 determines whether a response signal to the test signal is transmitted by each of the first and second extension phone sets 1 and 2 within a predetermined period of time. When determining that a response signal to the test signal is not transmitted by each of the first and second extension phone sets 1 and 2 within the predetermined period of time (S77: No), the CPU 16 goes to S81 based on the determination that the transmission/reception test is unsuccessful due to an abnormal communication condition in the second communication state. In S81, the CPU 16 changes the extension-phone-set network ID stored in the network setting storage area 41 back to the MFP network ID 300. Namely, the communication state is restored to the first communication state from the second communication state. In S83, the CPU 16 resends the communication state changing instruction to the first and second extension phone sets 1 and 2. Then, the CPU 16 goes back to S71.

Meanwhile, in S77, when determining that a response signal to the test signal is transmitted by each of the first and second extension phone sets 1 and 2 within the predetermined period of time (S77: Yes), the CPU 16 determines that a normal communication is performed in the second communication state. Accordingly, the CPU 16 goes to S79, in which the CPU 16 starts voice communication between the wireless communication control circuit 11 and the extension phone set 1 or 2 (not set as the routing device).

In S124 (see FIG. 5), the CPU 16 determines whether the voice communication using the extension phone set 1 or 2 is completed. When determining that the voice communication using the extension phone set 1 or 2 is not completed (S124: No), the CPU 16 goes back to S124 to wait in a standby state. Meanwhile, when determining that the voice communication using the extension phone set 1 or 2 is completed (S124: Yes), the CPU 16 goes to S125. In S125, the CPU 16 transmits a completed-voice-communication notifying signal to the first and second extension phone sets 1 and 2.

In S126, the CPU 16 determines whether the CPU 16 has received a command to restore the routing device to the MFP 10 from the extension phone set 1 or 2 set as the routing device. When determining that the CPU 16 has not received a command to restore the routing device to the MFP 10 from the extension phone set 1 or 2 set as the routing device (S126: No), the CPU 16 goes back to S126 to wait in a standby state. Meanwhile, when determining that the CPU 16 has received a command to restore the routing device to the MFP 10 from the extension phone set 1 or 2 set as the routing device (S126: Yes), the CPU 16 goes to S127.

In S127, the CPU 16 sends, to the first and second extension phone sets 1 and 2, a communication state restoring instruction to restore the routing device to the MFP 10. It is noted that the communication state restoring instruction may be transmitted, for instance, with a beacon broadcasted by the wireless communication control circuit 11. Thereby, it is possible to restore the routing device to the MFP 10 from the extension phone set 1 or 2 in response to the voice communication with the extension phone set 1 or 2 (not set as the routing device) being completed.

In S129, the CPU 16 determines whether the CPU 16 has received a response notifying that it is possible to change the routing device, from each of the first and second extension phone sets 1 and 2. When determining that the CPU 16 has not received such a response from each of the first and second extension phone sets 1 and 2 (S129: No), the CPU 16 goes back to S129 to wait in a standby state. Meanwhile, when determining that the CPU 16 has received such a response from each of the first and second extension phone sets 1 and 2 (S129: Yes), the CPU 16 goes to S131. In S131, the CPU 16 reads out the MFP network ID 300 from the network ID storage area 40. Then, the CPU 16 changes the first-extension-phone-set network ID 301 stored in the network setting storage area 41 back to the MFP network ID 300.

In S133, the CPU 16 transmits a test signal to the first and second extension phone sets 1 and 2. In S135, the CPU 16 determines whether a response signal to the test signal is transmitted by each of the first and second extension phone sets 1 and 2 within a predetermined period of time. When determining that a response signal to the test signal is not transmitted by each of the first and second extension phone sets 1 and 2 within the predetermined period of time (S135: No), the CPU 16 goes to S137. In S137, the CPU 16 again stores the MFP network ID 300 into the network setting storage area 41. In S139, the CPU 16 resends the communication state restoring instruction to the first and second extension phone sets 1 and 2. Then, the CPU 16 goes back to S129.

Meanwhile, in S135, when determining that a response signal to the test signal is transmitted by each of the first and second extension phone sets 1 and 2 within the predetermined period of time (S135: Yes), the CPU 16 goes to S143. In S143, the CPU 16 determines whether the data reception flag is set to "1." When determining that the data reception flag is set to "0" (S143: No), the CPU 16 terminates the present process shown in FIGS. 4 and 5. Meanwhile, when determining that the data reception flag is set to "1" (S143: Yes), the CPU 16 goes to S145. In S145, the CPU 16 transmits a deposit data transfer request to the extension phone set 1 or 2 set as the routing device. In S147, the CPU 16 receives deposit data in response to a response notifying that it is possible to transmit deposit data being received from the extension phone set 1 or 2 set as the routing device. Thereafter, the CPU 16 terminates the process at the side of the MFP 10 shown in FIGS. 4 and 5.

Figure 6:
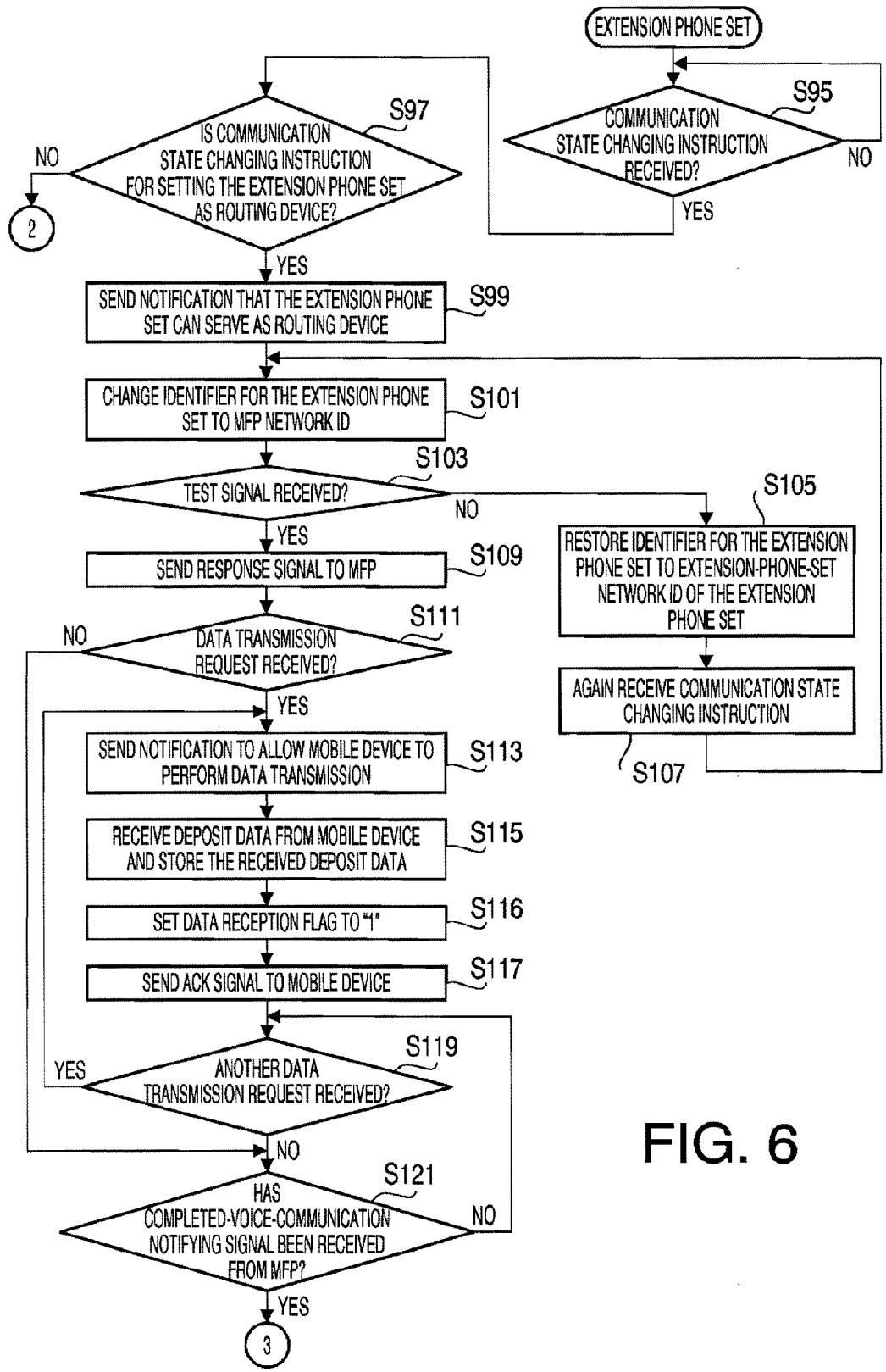
FIGS. 6 to 8 are flowcharts showing a procedure of a communication state switching process to be executed by extension phone sets to switch the communication state between the first communication state and the second communication state in the embodiment according to one or more aspects of the present invention.
Figure 7:
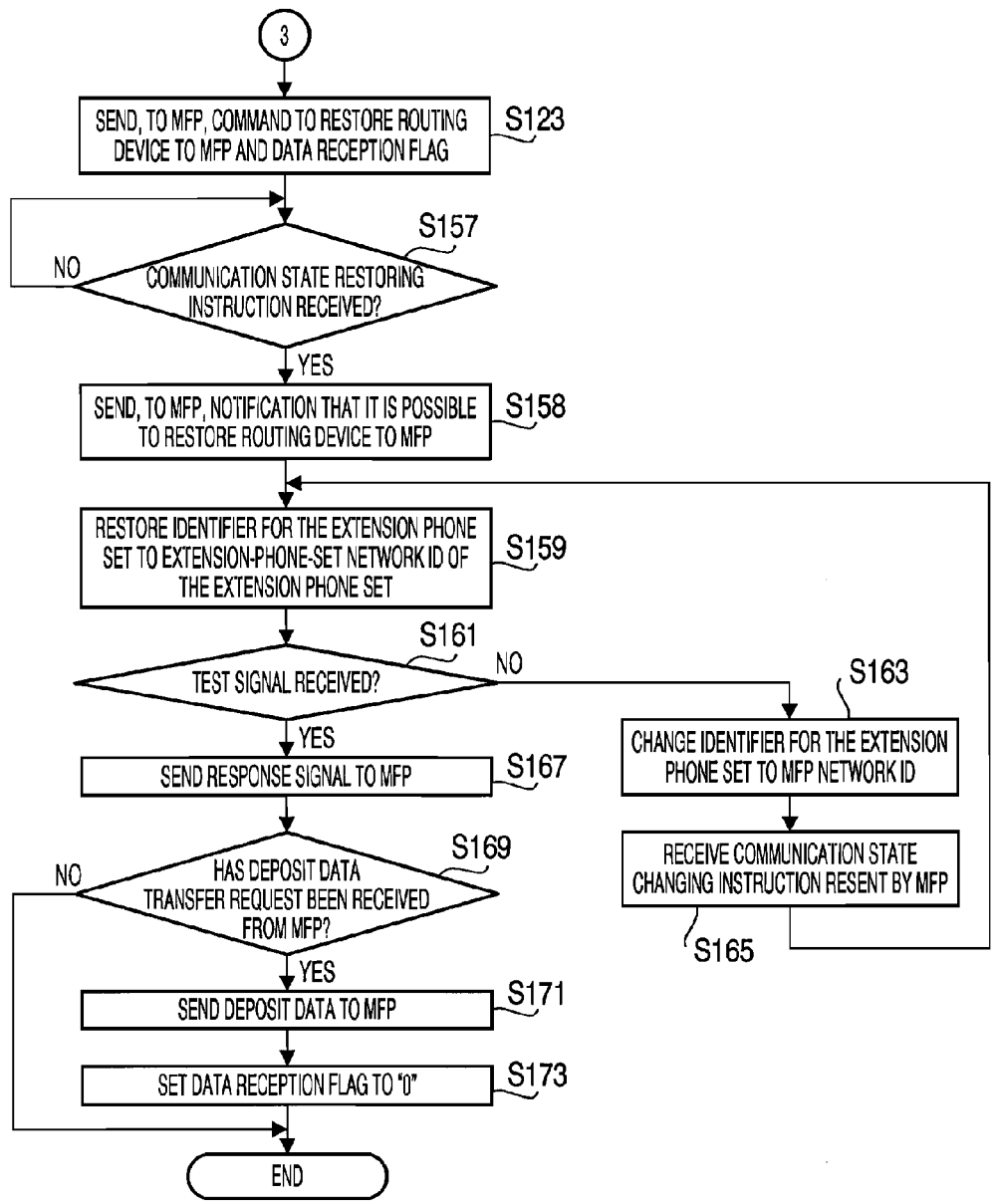
Figure 8:
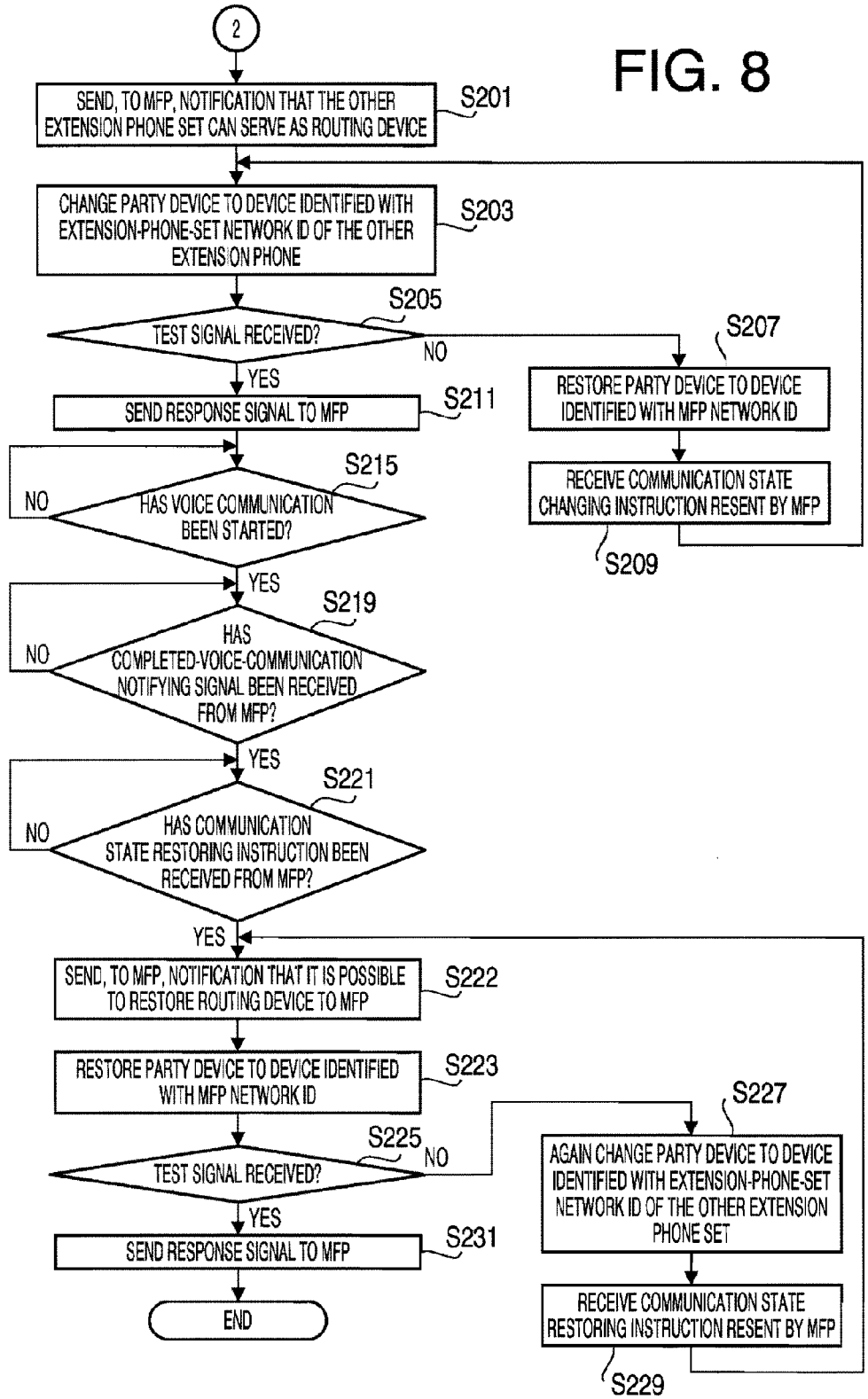

Subsequently, an explanation will be provided about a communication state switching process to be executed by the extension phone set 1 or 2 to switch the communication state between the first communication state and the second communication state, with reference to FIGS. 6 to 8. FIGS. 6 to 8 exemplify a communication state switching process by the first extension phone set 1. In S95, the CPU 76 determines whether the CPU 76 has received the communication state changing instruction from the MFP 10. When determining that the CPU 76 has not received the communication state changing instruction from the MFP 10 (S95: No), the CPU 76 goes back to S95 to wait in a standby state. Meanwhile, when determining that the CPU 76 has received the communication state changing instruction from the MFP 10 (S95: Yes), the CPU 76 goes to S97.

In S97, the CPU 76 determines whether the communication state changing instruction is for setting the first extension phone set 1 as the routing device. When determining that the communication state changing instruction is not for setting the first extension phone set 1 as the routing device (S97: No), the CPU 76 goes to S201 (see FIG. 8). Meanwhile, when determining that the communication state changing instruction is for setting the first extension phone set 1 as the routing device (S97: Yes), the CPU 76 goes to S99.

In S99, the CPU 76 transmits, to the MFP 10, a response notifying that the first extension phone set 1 can serve as the routing device in substitute for the MFP 10. In S101, the CPU 76 stores, into the network setting storage area 85, the MFP network ID 300 read out of the network ID storage area 84. Thus, the identifier for the first extension phone set 1 is changed to the MFP network ID 300.

In S103, the CPU 76 determines whether the CPU 76 has received the test signal from the MFP 10 within a predetermined period of time. When determining that the CPU 76 has not received the test signal from the MFP 10 within the predetermined period of time (S103: No), the CPU 76 goes to S105. In S105, the CPU 76 restores the identifier for the first extension phone set 1 to the first-extension-phone-set network ID 301. Further, in S105, a response signal to the test signal is not transmitted to the MFP 10. Thereby, it is possible to inform the MFP 10 that the CPU 76 has not received the test signal. In S107, the CPU 76 again receives the communication state changing instruction from the MFP 10, and goes back to S101.

Meanwhile, in S103, when determining that the CPU 76 has received the test signal from the MFP 10 within the predetermined period of time (S103: Yes), the CPU 76 goes to S109, based on the determination that the communication state is normally switched to the second communication state. In S109, the CPU 76 transmits a response signal to the MFP 10.

In S111, the CPU 76 determines whether the CPU 76 has received a data transmission request from the mobile device 4. The data transmission request is a signal for asking whether the mobile device 4 is allowed to transmit various kinds of data such as print data. In the second communication state, the MFP network ID 300 is used as the identifier for the extension phone set 1 or 2 that serves as the routing device. Therefore, even though the mobile device 4 transmits the data transmission request to the MFP 10, the data transmission request is actually sent to the extension phone set 1 or that serves as the routing device. Additionally, as an example of data transmitted by the mobile device 4, it is possible to cite print data for performing a printing operation with the printing unit 26. When determining that the CPU 76 has not received a data transmission request from the mobile device 4 (S111: No), the CPU 76 goes to S121. Meanwhile, when determining that the CPU 76 has received a data transmission request from the mobile device 4 (S111: Yes), the CPU 76 goes to S113.

In S113, the CPU 76 transmits, to the mobile device 4, a notification to allow the mobile device 4 to perform data transmission. In S115, the CPU 76 receives data transmitted by the mobile device 4 via the wireless communication 214, and stores the received data as deposit data into the storage unit 82. Thereby, during a period in the second communication state, the first extension phone set 1 can receive the data transmitted by the mobile device 4 to the MFP 10, in substitute for the MFP 10.

In S116, the CPU 76 sets the data reception flag stored in the setting storage area 83 to "1." The data reception flag is information indicating whether the deposit data is stored in the storage unit 82. The status "1" of the data reception flag denotes that the deposit data is stored. Meanwhile, the status "0" of the data reception flag denotes that the deposit data is not stored. In S117, when having completely received the data, the CPU 76 sends an ACK signal as a reply to the mobile device 4. In S119, the CPU 76 determines whether there is another data reception request received from the mobile device 4. When determining that there is another data reception request received from the mobile device 4 (S119: Yes), the CPU 76 goes back to S113. Meanwhile, when determining that there is not another data reception request received from the mobile device 4 (S119: No), the CPU 76 goes to S121. In S121, the CPU 76 determines whether the CPU 76 has received a completed-voice-communication notifying signal from the MFP 10. When determining that the CPU 76 has not received a completed-voice-communication notifying signal from the MFP 10 (S121: No), the CPU 76 goes back to S119. Meanwhile, when determining that the CPU 76 has received a completed-voice-communication notifying signal from the MFP 10 (S121: Yes), the CPU 76 advances to S123 (see FIG. 7).

In S123, the CPU 76 sends, to the MFP 10, a command to restore the routing device to the MFP 10 and the data reception flag. In S157, the CPU 76 determines whether the CPU 76 has received a communication state restoring instruction from the MFP 10. When determining that the CPU 76 has not received a communication state restoring instruction from the MFP 10 (S157: No), the CPU 76 goes back to S157 to wait in a standby state. Meanwhile, when determining that the CPU 76 has received a communication state restoring instruction from the MFP 10 (S157: Yes), the CPU 76 goes to S158. In S158, the CPU 76 transmits, to the MFP 10, a response notifying that it is possible to restore the routing device to the MFP 10 from the first extension phone set 1. In S159, the CPU 76 stores, into the network setting storage area 85, the first-extension-phone-set network ID 301 read out of the network ID storage area 84. Thereby, the identifier for the first extension phone set 1 is changed back to the first-extension-phone-set network ID 301.

In S161, the CPU 76 determines whether the CPU 76 has received the test signal from the MFP 10 within a predetermined period of time. When determining that the CPU 76 has not received the test signal from the MFP 10 within the predetermined period of time (S161: No), the CPU 76 goes to S163. In S163, the CPU 76 replaces the first-extension-phone-set network ID 301 stored in the network setting storage area 85 with the MFP network ID 300. Thereby, the identifier for the first extension phone set 1 is changed to the MFP network ID 300. In S165, the CPU 76 receives the communication state changing instruction resent by the MFP 10, and then goes back to S159.

Meanwhile, in S161, when determining that the CPU 76 has received the test signal from the MFP 10 within the predetermined period of time (S161: Yes), the CPU 76 goes to S167, based on the determination that the communication state is normally changed to the first communication state. In S167, the CPU 76 sends a response signal to the MFP 10.

In S169, the CPU 76 determines whether the CPU 76 has received a deposit data transfer request from the MFP 10. When determining that the CPU 76 has not received a deposit data transfer request from the MFP 10 (S169: No), the CPU 76 terminates the present process shown in FIGS. 6 and 7 (and 8). Meanwhile, when determining that the CPU 76 has received a deposit data transfer request from the MFP 10 (S169: Yes), the CPU 76 goes to S171. In S171, the CPU 76 sends the deposit data stored in the storage unit 85 to the MFP 10. In S173, the CPU 76 sets the data reception flag stored in the setting storage area 83 to "0." Thereafter, the CPU 76 terminates the present process shown in FIGS. 6 and 7 (and 8).

Subsequently, an explanation will be provided about a process to be executed by the extension phone set 1 or 2 that is used for voice communication in the second communication state, with reference to FIG. 8. It is noted the following description will exemplify a process by the second extension phone set 2. In S201, the CPU 76a sends, to the MFP 10, a response notifying that the first extension phone set 1 can serve as the routing device in substitution for the MFP 10. In S203, the CPU 76a stores, into the party device setting area 86a, the first-extension-phone-set network ID 301 read out of the network ID storage area 84a. Thereby, the party device with which the second extension phone set 2 is to communicate is changed to a device using the first-extension-phone-set network ID 301 as the identifier therefor, from a device using the MFP network ID 300 as the identifier therefor.

In S205, the CPU 76a determines whether the CPU 76a has received the test signal from the MFP 10 within a predetermined period of time. When determining that the CPU 76a has not received the test signal from the MFP 10 within the predetermined period of time (S205: No), the CPU 76a goes to S207. In S207, the CPU 76a replaces the first-extension-phone-set network ID 301 stored in the party device setting area 86a with the MFP network ID 300. In S209, when receiving the communication state changing instruction resent by the MFP 10, the CPU 76a goes back to S203.

Meanwhile, when determining that the CPU 76a has received the test signal from the MFP 10 within the predetermined period of time (S205: Yes), the CPU 76a advances to S211, based on the determination that the communication state is normally changed to the second communication state. In S211, the CPU 76a sends a response signal to the MFP 10.

In S215, the CPU 76a determines whether voice communication has been started with the second extension phone set 2. When determining that voice communication has not been started with the second extension phone set 2 (S215: No), the CPU 76a goes back to S215 to wait in a standby state. Meanwhile, when determining that voice communication has been started with the second extension phone set 2 (S215: Yes), the CPU 76a performs voice communication. In S219, the CPU 76a determines whether the CPU 76a has received the completed-voice-communication notifying signal from the MFP 10. When determining that the CPU 76a has not received the completed-voice-communication notifying signal from the MFP 10 (S219: No), the CPU 76a goes back to S219 to continue the voice communication. Meanwhile, when determining that the CPU 76a has received the completed-voice-communication notifying signal from the MFP 10 (S219: Yes), the CPU 76a terminates the voice communication and advances to S221.

In S221, the CPU 76a determines whether the CPU 76a has received the communication state restoring instruction from the MFP 10. When determining that the CPU 76a has not received the communication state restoring instruction from the MFP 10 (S221: No), the CPU 76a goes back to S221 to wait in a standby state. Meanwhile, when determining that the CPU 76a has received the communication state restoring instruction from the MFP 10 (S221: Yes), the CPU 76a goes to S222. In S222, the CPU 76a sends, to the MFP 10, a response notifying that it is possible to restore the routing device to the MFP 10 from the first extension phone set 1. In S223, the CPU 76a stores, into the party device setting area 86a, the MFP network ID 300 read out of the network ID storage area 84a. Thereby, the party device with which the second extension phone set 2 is to communicate is restored to a device that uses the MFP network ID 300 as the identifier therefor.

In S225, the CPU 76a determines whether the CPU 76a has received the test signal from the MFP 10 within a predetermined period of time. When determining that the CPU 76a has not received the test signal from the MFP 10 within the predetermined period of time (S225: No), the CPU 76a goes to S227. In S227, the CPU 76a again changes the party device of the second extension phone set 2 to a device that uses the first-extension-phone-set network ID as the identifier therefor. In S229, when receiving the communication state restoring instruction resent by the MFP 10, the CPU 76a goes back to S222.

Meanwhile, when determining that the CPU 76a has received the test signal from the MFP 10 within the predetermined period of time (S225: Yes), the CPU 76a sends a response signal to the MFP 10. After that, the CPU 76a terminates the present process shown in FIG. 8.

An explanation will be provided about a specific example of processes of the communication system 5 of the embodiment, with reference to FIGS. 11 and 12. The following description will provide an example under an assumption that the first extension phone set 1 is set to serve as the routing device, that the substitutability bit of the first extension phone set 1 is "1," and that data is transmitted by the mobile device 4 during the period in the second communication state.

When the MFP 10 receives an incoming call for voice communication from the telephone line network 100 (S51: Yes), the first and second extension phone sets 1 and 2 sound (S53). When the user answers the call with the second extension phone set 2 (S55: No), the MFP 10 sends, to the first and second extension phone sets 1 and 2, a communication state changing instruction to change the routing device from the MFP 10 to the first extension phone set 1 (S67), as the substitutability bit of the first extension phone set 1 is "1" (S65: Yes).

When receiving the communication state changing instruction (S95: Yes), the first extension phone set 1 determines that the received instruction is for setting the first extension phone set 1 as the routing device (S97: Yes), and sends to the MFP 10 a response notifying that the first extension phone set 1 can serve as the routing device in substitution for the MFP 10 (S99). Further, the first extension phone set 1 changes the identifier therefor from the first-extension-phone-set network ID 301 to the MFP network ID 300 (S101).

When receiving the communication state changing instruction (S95: Yes), the second extension phone set 2 determines that the received instruction is for setting an extension phone set other than the second extension phone set 2 (i.e., the first extension phone set 1) as the routing device (S97: No), and sends to the MFP 10 a response notifying that it is possible to set the first extension phone set 1 as the routing device in substitution for the MFP 10 (S201). Further, the second extension phone set 2 changes the party device thereof from a device that uses the MFP network ID 300 as the identifier therefor to a device that uses the firs-extension-phone-set network ID 300 as the identifier therefor (S203).

When receiving the responses notifying that it is possible to set the first extension phone set 1 as the routing device in substitution for the MFP 10 (S71: Yes), the MFP 10 changes the identifier therefor from the MFP network ID 300 to the first-extension-phone-set network ID 301 (S73). Thereby, the communication state is switched from the first communication state (see FIG. 9) to the second communication state (see FIG. 10).

The MFP 10 sends a test signal to the first and second extension phone sets 1 and 2 (S75). When receiving the test signal within a predetermined period of time (S103: Yes), the first extension phone set 1 sends a response signal to the MFP 10 (S109). Further, when receiving the test signal within a predetermined period of time (S205: Yes), the second extension phone set 2 sends a response signal to the MFP 10 (S211). When receiving the response signals from the first and second extension phone sets 1 and 2 within a predetermined period of time (S77: Yes), the MFP 10 starts voice communication using the second extension phone set 2 (S79).

When receiving the data transmission request from the mobile device 4 (S111: Yes), the first extension phone set 1 sends, to the mobile device 4, a notification to allow the mobile device 4 to perform data transmission (S113). Then, the first extension phone set 1 receives data transmitted by the mobile device 4, and holds the received data as deposit data (S115). Further, the first extension phone set 1 sets the data reception flag to "1" (S116), and sends an ACK signal as a reply to the mobile device 4 (S117).

When completing the voice communication (S124: Yes), the MFP 10 sends a completed-voice-communication notifying signal to the first and second extension phone sets 1 and 2 (S125). When receiving the completed-voice-communication notifying signal (S121: Yes), the first extension phone set 1 sends, to the MFP 10, a command to restore the routing device to the MFP 10 and the data reception flag (S123). When receiving the command to restore the routing device to the MFP 10 (S126: Yes), the MFP 10 sends a communication state restoring instruction to the first and second extension phone sets 1 and 2 (S127).

When receiving the communication state restoring instruction (S157: Yes), the first extension phone set 1 sends to the MFP 10 a response notifying that it is possible to restore the routing device to the MFP 10 from the first extension phone set 1 (S158). Further, the first extension phone set 1 restores the identifier therefor to the first-extension-phone-set network ID 301 from the MFP network ID 300 (S159). When receiving a completed-voice-communication notifying signal (S219: Yes) and a communication state restoring instruction (S221: Yes), the second extension phone set 2 sends to the MFP 10 a response notifying that it is possible to restore the routing device to the MFP 10 from the first extension phone set 1 (S222). Further, the second extension phone set 2 restores the party device thereof to a device that uses the MFP network ID 300 as the identifier therefor from a device that uses the first-extension-phone-set network ID 301 as the identifier therefor (S223).

When receiving a response notifying that it is possible to switch the routing device from the first extension phone set 1 to the MFP 10 (S129: Yes), the MFP 10 restores the identifier therefor to the MFP network ID 300 from the first-extension-phone-set network ID 301 (S131). Thereby, the communication state is switched from the second communication state (see FIG. 10) to the first communication state (see FIG. 9).

The MFP 10 sends a test signal to the first and second extension phone sets 1 and 2 (S133). When receiving the test signal within a predetermined period of time (S161: Yes), the first extension phone set 1 sends a response signal to the MFP 10 (S167). Further, when receiving the test signal within a predetermined period of time (S225: Yes), the second extension phone set 2 sends a response signal to the MFP 10 (S231). When receiving the response signals from the first and second extension phone sets 1 and 2 within a predetermined period of time (S135: Yes), the MFP 10 determines that the data reception flag is set to "1" (S143: Yes), and sends a deposit data transfer request to the first extension phone set 1 (S145). When receiving the deposit data transfer request (S169: Yes), the first extension phone set 1 sends the deposit data to the MFP 10 (S171), and sets the data reception flag to "0" (S173). The MFP 10 receives the deposit data from the first extension phone set 1 (S147). Through the above procedure, the operation of the communication system 5 is terminated.

The communication system 5 configured as above in the embodiment can provide the following effects. The voice communication, which is required to be performed in a real-time basis, is a heavier-load communication than the data communication. Therefore, when voice communication with the second extension phone set 2 and data communication with the mobile device 4 are performed in parallel in the first communication state (see FIG. 9), a heavy load is placed on the wireless communications 212 and 213. Therefore, it might result in a communication error such as an error that the voice communication is interrupted and/or a lowered communication speed. However, in the communication system 5 of the embodiment, the communication state is switched from the first communication state to the second communication state when voice communication is started in response to receipt of an incoming call from the telephone line network 100. In the second communication state (see FIG. 10), the voice communication is performed via the wireless communication 212 between the second extension phone set 2 and the wireless communication control circuit 11. Further, the data communication is performed via the wireless communication 214 between the first extension phone set 1 and the mobile device 4. Accordingly, it is possible to separate the voice communication from the data communication. Thereby, it is possible to reduce a load placed on the wireless communication control circuit 11 of the MFP 10 and thus prevent a communication error.

Further, the communication system 5 of the embodiment needs not provide the mobile device 4 with information such as a notification that the party device of the mobile device 4 is to be changed, and information on a new party device of the mobile device 4 and a moment when the party device of the mobile device 4 is to be changed, when the communication state is switched between the first communication state and the second communication state. Therefore, since the communication system 5 is not required to make the mobile device 4 perform a special process for switching the communication state, it is possible to simplify switching control for switching the communication state. Thereby, it is possible to avoid undesired situations such as a situation where a long period of time is needed to switch the communication state and a situation where a load placed on the communication system 5 is increased.

Further, in the communication system 5 of the embodiment, during the period in the second communication state, the first extension phone set 1 receives and holds data transmitted by the mobile device 4, in substitution for the MFP 10. Then, in response to the communication state being restored to the first communication state, the first extension phone set 1 sends the held data to the MFP 10. Thereby, it is possible to prevent the mobile device 4 from repeatedly resending the data in vain due to a transmission error that the data is not received by any device.

Further, in the communication system 5 of the embodiment, it is possible to detect a situation where the communication state cannot be switched to the second communication state, by employing a test signal. Moreover, the communication system 5 applies a fail-safe configuration to restore the communication state to the first communication state when there is a trouble caused in the second communication state. Thereby, it is possible to ensure reliability of the communication system 5.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The device that transmits the data transmission request in S111 (see FIG. 6) is not limited to the mobile device 4. Any device connected with the communication system 5 may transmit the data transmission request. For instance, the PC 52 may transmit the data transmission request.

In each of the network ID storage area 40 of the MFP 10, the network ID storage area 84 of the first extension phone set 1, and the network ID storage area 84a of the second extension phone set 2, the MFP network ID 300, the first-extension-phone-set network ID 301, and the second-extension-phone-set network ID 302 are stored. A moment, when the MFP network ID 300, the first-extension-phone-set network ID 301, and the second-extension-phone-set network ID 302 are stored into each of the network ID storage area 40, the network ID storage area 84, and the network ID storage area 84a, may be a moment before or at the time of shipping of a set of the MFP 10, the first extension phone set 1, and the second extension phone set 2. Alternatively, the moment may be a moment when an extension phone set is additionally connected to the communication system 5. For instance, the following description will be provided under an assumption that the second extension phone set 2 is added to the communication system 5 including the MFP 10 and the first extension phone set 1. In this case, the second-extension-phone-set network ID 302 may be transmitted to the MFP 10 by the second extension phone set 2 and stored into the network ID storage area 40. In addition, the second-extension-phone-set network ID 302 may be transmitted to the first extension phone set 1 by the second extension phone set 2 and stored into the network ID storage area 84. Further, the MFP network ID 300 may be transmitted to the second extension phone set 2 by the MFP 10 by and stored into the network ID storage area 84a. Furthermore, the first-extension-phone-set network ID 301 may be transmitted to the second extension phone set 2 by the first extension phone set 1 and stored into the network ID storage area 84a. It is noted that the network IDs 300, 301, and 302 may be transmitted mutually in the communication system 5 in a method employing a beacon.

Further, the MFP 10 may be configured with a communication unit and a multi-function unit that are physically separated from one another. The communication unit may include elements of the MFP 10 that are required to control communication using the telephone line network 100. The multi-function unit 10 may includes elements of the MFP 10 that are required to achieve multiple functions such as a scanning function and a printing function, other than the elements of the communication unit. In this case, the WPAN 201 and the WLAN 202 may be established by the communication unit. In addition, the communication unit and the multi-function unit may be configured to communicate with each other via the WLAN 202. Thereby, it is possible to form a dispersed multi-function peripheral with the communication unit and the multi-function unit. Thus, since a connector of the telephone line network 100 is not required to be connected directly with a large-volume MFP 10, it is possible to lay out the MFP 10 in a more appropriate manner and enhance user-friendliness.

What is claimed is:

1. A communication system comprising:
   a communication device configured to connect with a communication line;
   a first phone device; and
   a second phone device, the communication system configured to connect the communication device, the first phone device, and the second phone device with each other via wireless communication,
   wherein the communication device comprises:
      a wireless communication unit configured to wirelessly perform data communication and voice communication with an external device, the first phone device, and the second phone device; and
      a communication-device storage unit configured to store a communication-device network ID for identifying the communication device and a first-phone-device network ID for identifying the first phone device,
   wherein the first phone device comprises a first-phone-device storage unit configured to store the first-phone-device network ID and the communication-device network ID,
   wherein the communication system is configured to switch a communication state thereof from a first communication state, in which the wireless communication unit performs both data communication with the external device and voice communication with the first phone device and the second phone device, to a second communication state, in which voice communication between the wireless communication unit and the second phone device is performed separately from data communication between the first phone device and the external device, by changing settings of the communication-device network ID and the first-phone-device network ID stored in the communication-device storage unit and the first-phone-device storage unit when voice communication is started using the second phone device in response to an incoming call from the communication line,
   wherein the first communication state is set when the communication-device network ID is used for the communication device such that the communication device is recognized as the communication device on the communication system, the first-phone-device network ID is used for the first phone device such that the first phone device is recognized as the first phone device on the communication system, and a communication party device of the external device, the first phone device, and the second phone device is set to the communication device for which the communication-device network ID is used, and
   wherein the second communication state is set when the first-phone-device network ID is used for the communication device such that the communication device is recognized as the first phone device on the communication system, the communication-device network ID is used for the first phone device such that the first phone device is recognized as the communication device on the communication system, and a communication party device of the second phone device is set to the communication device for which the first-phone-device network ID is used.

2. The communication system according to claim 1,
wherein the communication device further comprises a communication-device controller configured to control the communication device,
wherein the first phone device further comprises a first-phone-device controller configured to control the first phone device,
wherein the second phone device further comprises a second-phone-device controller configured to control the second phone device and a second-phone-device storage unit configured to store the first-phone-device network ID and the communication-device network ID,
wherein the communication-device controller is configured to, when the voice communication is started using the second phone device in response to the incoming call from the communication line, send a communication state changing instruction to the first phone device and the second phone device, read out the first-phone-device network ID from the communication-device storage unit, and use the first-phone-device network ID for the communication device such that the communication device is recognized as the first phone device on the communication system,
wherein the first-phone-device controller is configured to, in response to receipt of the communication state changing instruction, read out the communication-device network ID from the first-phone-device storage unit, and use the communication-device network ID for the first phone device such that the first phone device is recognized as the communication device on the communication system, and
wherein the second-phone-device controller is configured to, in response to receipt of the communication state changing instruction, read out the first-phone-device network ID from the second-phone-device storage unit, and set a device for which the first-phone-device network ID is used, to the communication party device with which the second phone device is to communicate.

3. The communication system according to claim 2,
wherein the communication-device controller is configured to, in response to detecting completion of the voice communication using the second phone device, send a communication state restoring instruction to the first phone device, read out the communication-device network ID from the communication-device storage unit, and use the communication-device ID for the communication device such that the communication device is recognized as the communication device on the communication system,
wherein the first-phone-device controller is configured to, in response to receipt of the communication state restoring instruction, read out the first-phone-device network ID from the first-phone-device storage unit, and set the first-phone-device network ID for the first phone device such that the first phone device is recognized as the first phone device on the communication system, and
wherein the second-phone-device controller is configured to, in response to receipt of the communication state restoring instruction, read out the communication-device network ID from the second-phone-device storage unit, and set a device for which the communication-device network ID is used, to the communication party device with which the second phone device is to communicate.

4. The communication system according to claim 2,
wherein the first-phone-device controller is configured to determine a radio field intensity between a relay device and a wireless terminal device in the communication system, and set radio field intensity information to a value indicating that it is possible to change the communication state when the determined radio field intensity is equal to or more than a predetermined threshold, and
wherein the communication-device controller is configured to, when the voice communication is started using the second phone set in response to the incoming call from the communication line, send the communication state changing instruction in a case where the radio field intensity information is set to the value indicating that it is possible to change the communication state.

5. The communication system according to claim 2,
wherein the communication-device controller is configured to, after using the first-phone-device network ID for the communication device, send a test signal to the second phone device,
wherein the second-phone-device controller is configured to, in response to receipt of the test signal from the communication device, send a response signal to a device for which the first-phone-device network ID is used, and
wherein the communication-device controller is configured to, in response to receipt of the response signal from the second phone device, start the voice communication between the wireless communication unit thereof and the second phone device, and restore the communication state to the first communication state in a case where not receiving the response signal within a predetermined period of time.

6. A communication device configured to connect with a communication line and wirelessly communicate with a first phone device and a second phone device, the communication device comprising:
a wireless communication unit configured to wirelessly perform data communication and voice communication with an external device, the first phone device, and the second phone device;
a communication-device storage unit configured to store a communication-device network ID for identifying the communication device and a first-phone-device network ID for identifying the first phone device; and
a communication-device controller configured to selectively set one of the communication-device network ID and the first-phone-device network ID as a network ID for the communication device,
wherein the communication-device controller is configured to switch a communication state from a first communication state, in which the wireless communication unit performs both data communication with the external device and voice communication with the first phone device and the second phone device, to a second communication state, in which voice communication between the wireless communication unit and the second phone device is performed separately from data communication between the first phone device and the external device, by changing settings of the communication-device network ID and the first-phone-device network ID stored in the communication-device storage unit and a first-phone-device storage unit of the first phone in response to receiving, from the second phone device, a response signal to an incoming call from the communication line,
wherein the first communication state is set when the communication-device controller sets the communication-device network ID as the network ID for the communication device, and wherein the second communication state is set when the communication-device controller sets the first-phone-device network ID as the network ID for the communication device and the wireless communication unit sends to the second phone device a command to set a device for which the first-phone-device network ID is used as a communication party device of the second phone device.

7. A phone device configured to wirelessly communicate with a communication device connected with a communication line, comprising:
   a phone-device storage unit configured to store a phone-device network ID for identifying the phone device and a communication-device network ID for identifying the communication device; and
   a phone-device controller configured to selectively set one of the communication-device network ID and the first-phone-device network ID as a network ID for the phone device,
   wherein the phone-device controller is configured to switch a communication state from a first communication state, in which a wireless communication unit of the communication device performs both data communication with an external device and voice communication with the phone device and another phone device, to a second communication state, in which voice communication between the wireless communication unit and the other phone device is performed separately from data communication between the phone device and the external device, by changing settings of the communication-device network ID and the first-phone-device network ID stored in a communication-device storage unit of the communication device and the phone-device storage unit in response to receiving a communication state changing instruction from the communication device,
   wherein the first communication state is set when the phone-device controller sets the phone-device network ID as the network ID for the phone device and
   wherein the second communication state is set when the phone-device controller sets the communication-device network ID as the network ID for the phone device.

* * * * *